United States Patent
Suib et al.

(10) Patent No.: US 10,081,006 B2
(45) Date of Patent: Sep. 25, 2018

(54) ADSORPTIVE DESULFURIZATION

(71) Applicant: UNIVERSITY OF CONNECTICUT, Farmington, CT (US)

(72) Inventors: Steven L. Suib, Storrs, CT (US); Lakshitha R. Pahalagedara, Willimantic, CT (US); Chung-hao Kuo, Willington, CT (US)

(73) Assignee: University of Connecticut, Farmington, CT (US)

( * ) Notice: Subject to any disclaimer, the term of this patent is extended or adjusted under 35 U.S.C. 154(b) by 279 days.

(21) Appl. No.: 14/972,339

(22) Filed: Dec. 17, 2015

(65) Prior Publication Data

US 2016/0175806 A1    Jun. 23, 2016

Related U.S. Application Data (60) Provisional application No. 62/093,196, filed on Dec. 17, 2014.

(51) Int. Cl.
| | |
|---|---|
| *B01D 53/04* | (2006.01) |
| *B01J 20/06* | (2006.01) |
| *B01D 53/02* | (2006.01) |
| *B01J 20/30* | (2006.01) |
| *C01G 45/12* | (2006.01) |

(52) U.S. Cl.
CPC ............. *B01J 20/06* (2013.01); *B01D 53/02* (2013.01); *B01J 20/3042* (2013.01); *C01G 45/1221* (2013.01); *B01D 53/0423* (2013.01); *B01D 2253/116* (2013.01); *B01D 2253/1124* (2013.01); *B01D 2253/25* (2013.01); *B01D 2253/302* (2013.01); *B01D 2257/304* (2013.01); *B01D 2257/306* (2013.01); *B01D 2258/0283* (2013.01); *B01D 2259/128* (2013.01); *B01D 2259/40088* (2013.01); *C01P 2002/50* (2013.01); *C01P 2002/52* (2013.01); *C01P 2002/70* (2013.01); *C01P 2004/04* (2013.01)

(58) Field of Classification Search
CPC ............... B01D 53/02; B01D 53/0423; B01D 2253/1124; B01D 2253/116; B01D 2253/25; B01D 2253/302; B01D 2257/304; B01D 2257/306; B01D 2258/0283; B01D 2259/128; B01D 2259/40088; C01G 45/1221; B01J 20/06; B01J 20/3042; C01P 2002/50; C01P 2002/52; C01P 2002/70; C01P 2002/04
USPC ................... 95/135, 136, 148, 902; 96/153; 423/244.01, 244.06; 502/400, 406; 210/660
See application file for complete search history.

(56) References Cited

U.S. PATENT DOCUMENTS

| | | | | |
|---|---|---|---|---|
| 4,072,586 | A * | 2/1978 | De Nora | C25B 11/0478 204/290.12 |
| 7,700,517 | B2 * | 4/2010 | Li | B01D 53/949 502/324 |
| 8,211,212 | B2 * | 7/2012 | Lambert | C01B 13/0203 423/579 |
| 2002/0182135 | A1 * | 12/2002 | Braga | B01D 53/8668 423/244.06 |
| 2005/0169826 | A1 * | 8/2005 | Li | B01D 53/9431 423/244.06 |
| 2008/0121584 | A1 * | 5/2008 | Chen | B01J 20/06 210/496 |
| 2014/0255805 | A1 * | 9/2014 | Wang | H01M 8/0675 429/410 |

FOREIGN PATENT DOCUMENTS

| | | |
|---|---|---|
| CN | 101711990 B * | 12/2012 |
| WO | WO 2014/141199 A1 * | 9/2014 |

OTHER PUBLICATIONS

Machine-generated English translation of CN 101711990 B, published Dec. 2012.*
Li, et al., "High-Capacity Sulfur Dioxide Absorbents for Diesel Emissions Control", Ind. Eng. Chem. Res., 2005, 44, 168-177.
Polato, et al.,"High Surface Area Mn,Mg,Al-Spinels as Catalyst Additives for Sox Abatement in Fluid Catalytic Cracking Units", Ind. Eng. Chem. Res., 2010, 49, 1252-1258.
Centi, et al., "Behaviour of SOx-traps derived from ternary Cu/Mg/Al hydrotalcite materials", Catalysis Today, 2007, 127, 219-229.
Schreier, et al., "Powder and Monolith-Supported Sulphur Trap Materials Based on Modified Hydrotalcite-Derived Supports", Catal. Lett., 2007, 117, 53-61.

* cited by examiner

*Primary Examiner* — Frank Lawrence
(74) *Attorney, Agent, or Firm* — Bryan D. Zerhusen; Locke Lord LLP (57) ABSTRACT

The disclosure relates to a method for removing sulfur-containing compounds from a fluid. The method involves adding manganese oxide to the fluid; doping the manganese oxide in situ with iron, cobalt, or combinations thereof to give a doped manganese oxide adsorbent; and contacting the fluid with a selected amount of the doped manganese oxide adsorbent and at a selected temperature and pressure sufficient for the doped manganese oxide adsorbent to preferentially adsorb the sulfur-containing compounds in the fluid. The disclosure also relates to a process for preparing a doped manganese oxide adsorbent, and a doped manganese oxide adsorbent prepared by the process. The disclosure further relates to a method for tuning structural properties (e.g., surface area, pore size and pore volume) of a doped manganese oxide adsorbent.

12 Claims, 11 Drawing Sheets

| Sample No: | Naming | Structure | Surface Area (m²/g) | Pore Size (cc/g) | Pore Diameter (nm) |
|---|---|---|---|---|---|
| 1 | 5%-Fe-MnOx | Birnessite | 221 | 0.39 | 6.1 |
| 2 | 10%-Fe-MnOx | Birnessite | 283 | 0.31 | 3.7 |
| 3 | 15%-Fe-MnOx | Birnessite | 304 | 0.28 | 3.5 |
| 4 | 5%-Co-MnOx | Cryptomelane | 112 | 0.27 | 10 |
| 5 | 10%-Co-MnOx | Cryptomelane | 135 | 0.42 | 11 |
| 6 | 15%-Co-MnOx | Cryptomelane | 138 | 0.34 | 86 |

ADSORPTIVE DESULFURIZATION

RELATED APPLICATION

This application claims the benefit of U.S. Provisional Application Ser. No. 62/093,196, filed on Dec. 17, 2014, which is incorporated herein by reference in its entirety.

BACKGROUND

1. Field of the Disclosure

This disclosure relates to doped manganese oxide adsorbent materials useful in adsorptive desulfurization. In particular, this disclosure relates to doped manganese oxide adsorbent materials and processes for preparing the doped manganese oxide materials having tunable properties, for example, tunable surface area, pore size and pore volume.

2. Discussion of the Background Art

Metal oxides and mixtures are generally chosen as desulfurization sorbents for hot gas desulfurization processes. However, the problem with these largely existing materials is that they suffer from low performance and thermally instability. For example, zinc oxide materials are widely used, and they have been investigated for practical applications. The main drawback of using zinc oxide is the fact that reduction of zinc oxide to metallic zinc occurs around 700° C., largely decreasing the sulfur adsorption capacity. Although other materials, such as carbon or metal doped carbon, are much lower in price, they have a much lower capacity than metal oxide based material. Therefore, there is a need for new sulfur adsorbents with both high performance and low cost.

High sulfur sorption capacity materials are high in demand, having already been investigated due to their potential applications in conventional power generation, polymer electrolyte fuel cells and other processes requiring desulfurization. Manganese oxide octahedral molecular sieves (OMS) materials are promising, having shown to be among the best in terms of performance for desulfurization processes. It would be desirable to increase the sulfur capacity and lower the cost of material.

The present disclosure provides many advantages over the prior art, which shall become apparent as described below.

SUMMARY OF THE DISCLOSURE

This disclosure relates to doped manganese oxide adsorbent materials useful in adsorptive desulfurization. In particular, this disclosure relates to doped manganese oxide adsorbent materials and processes for preparing the doped manganese oxide materials having tunable properties, for example, tunable surface area, pore size and pore volume.

This disclosure also relates in part to a method for removing sulfur-containing compounds from a fluid. The method involves adding manganese oxide to the fluid; doping the manganese oxide in situ with iron, cobalt, or combinations thereof to give a doped manganese oxide adsorbent; and contacting the fluid with a selected amount of the doped manganese oxide adsorbent and at a selected temperature and pressure sufficient for the doped manganese oxide adsorbent to preferentially adsorb the sulfur-containing compounds in the fluid.

This disclosure further relates in part to a process for preparing an adsorbent material. The process involves adding manganese oxide to the fluid; doping the manganese oxide in situ with iron, cobalt, or combinations thereof to give a doped manganese oxide adsorbent; and contacting the fluid with a selected amount of the doped manganese oxide adsorbent and at a selected temperature and pressure and for a period of time sufficient to prepare a doped manganese oxide adsorbent material.

This disclosure yet further relates in part adsorbent material prepared by a process. The process involves adding manganese oxide to the fluid; doping the manganese oxide in situ with iron, cobalt, or combinations thereof to give a doped manganese oxide adsorbent; and contacting the fluid with a selected amount of the doped manganese oxide adsorbent and at a selected temperature and pressure and for a period of time sufficient to prepare a doped manganese oxide adsorbent material.

This disclosure also relates in part to a method for tuning structural properties of an adsorbent material. The method involves adding manganese oxide to a fluid; doping the manganese oxide in situ with iron, cobalt, or combinations thereof to give a doped manganese oxide adsorbent; and contacting the fluid with a selected amount of the doped manganese oxide adsorbent and at a selected temperature and pressure and for a selected period of time sufficient to tune the structural properties (e.g., surface area, pore size and pore volume) of the doped manganese oxide adsorbent.

This disclosure also relates in part to a composition comprising at least one derivative, doped or reduced compound of the formula $$MMn_8O_{16}$$

wherein M is an alkali metal or an alkaline earth metal. In an embodiment, the composition comprises at least one derivative, doped or reduced compound of the formula $$KMn_8O_{16}$$

or at least one derivative, doped or reduced compound of the formula $$M_vCo_xFe_yMn_zO_{16}$$

wherein M is an alkali metal or an alkaline earth metal, and $\underline{v}$, $\underline{x}$, $\underline{y}$, and $\underline{z}$ independently have a value from 0 to 8. In an embodiment, the composition has a Birnessite type structure or a Cryptomelane type structure.

Further objects, features and advantages of the present disclosure will be understood by reference to the following drawings and detailed description.

DETAILED DESCRIPTION OF THE PREFERRED EMBODIMENT

All numerical values within the detailed description and the claims herein are modified by "about" or "approximately" the indicated value, and take into account experimental error and variations that would be expected by a person having ordinary skill in the art.

This disclosure provides iron and cobalt doped manganese oxide materials which function as efficient sulfur adsorbents. Different doping amounts of iron and cobalt into manganese oxide can be used in accordance with this disclosure. Creation of high surface area properties can be achieved by controlling the reaction conditions and temperature. The iron and cobalt doped manganese oxide materials preserved the adsorption capacities even with dilution of clay binders. These iron and cobalt doped manganese oxide manganese oxides possess excellent properties for gas phase hydrogen sulfide removal.

This disclosure provides a method for in situ metal doping into manganese oxide system. The method creates a change in the final structure of manganese oxide with different incorporated metals. Physicochemical properties, such as surface area, pore size, and pore volume can also be adjusted by changing the amount of metal doping. Gas phase $H_2S$ sulfur adsorption tests show that the metal doped manganese oxide materials of this disclosure have a much higher sulfur capacity than regular K-OMS-2 materials. Additionally, the metal doped manganese oxide materials of this disclosure were diluted with binders to lower the cost, with the performance only showing only minor decline even under higher percentage dilution.

The doped manganese oxide adsorbent materials prepared by the process of this disclosure have tunable properties, for example, tunable surface area, pore size and pore volume.

The doped manganese oxide adsorbents of this disclosure have a high sulfur sorption capacity, for example, from about 20 to about 80 g-S/100 g sorbent after sulfidation at 300° C., preferably from about 25 to about 70 g-S/100 g sorbent after sulfidation at 300° C., and more preferably from about 30 to about 60 g-S/100 g sorbent after sulfidation at 300° C. Also, the doped manganese oxide+binder adsorbents of this disclosure have a high sulfur sorption capacity, for example from about 20 to about 80 g-S/100 g sorbent after sulfidation at 300° C., preferably from about 25 to about 70 g-S/100 g sorbent after sulfidation at 300° C., and more preferably from about 30 to about 60 g-S/100 g sorbent after sulfidation at 300° C.

The manganese oxide is preferably a manganese oxide octahedral molecular sieve (OMS) material. The iron doped manganese oxide adsorbent preferably has a Birnessite type structure. The cobalt doped manganese oxide adsorbent preferably has a Cryptomelane type structure.

The iron in the iron doped manganese oxide adsorbent is present in an amount of from about 0.1 weight percent to about 25 weight percent.

The cobalt in the cobalt doped manganese oxide adsorbent is present in an amount of from about 0.1 weight percent to about 25 weight percent.

The doped manganese oxide adsorbent can include a binder material, for example, a clay binder, and still retain adsorption capacity. The use of binders contributes to low cost for the adsorbent materials.

The metal oxide adsorbent material useful in the process of this disclosure removes sulfur contaminants, including oxides of sulfur, hydrogen sulfide, and thiols from the contaminated fluid, preferably gas. The presence of the metal oxide adsorbent material ensures that the product begins to work immediately after being placed in a contaminated environment. The metal oxide adsorbent can be manganese oxide, manganese hydroxide, iron oxide, iron hydroxide, zinc oxide, zinc hydroxide, and combinations thereof. The use of manganese oxide is preferred.

The concentration of the manganese oxide used in the process of this disclosure can vary over a wide range and need only be at a concentration sufficient to form the manganese oxide adsorbent materials. The manganese oxide can be present in a molar concentration ratio of from about 1 M to about 10 M, preferably from about 1 M to about 5 M, and more preferably from about 0.5 M to about 1 M (based on a total volume).

One or more metal dopant precursors are useful in the processes of this disclosure. Physicochemical properties of the manganese oxide adsorbent materials of this disclosure can be controlled by the use of metal dopant precursors in the synthesis thereof. The metal dopant precursors useful in this disclosure makes the tuning of physicochemical properties of the manganese oxide adsorbent materials possible by controlling surface area, pore size and pore volume.

Illustrative metal dopant precursors include, for example, metal halides, metal phosphates, metal acetates, metal nitrates, metal alkoxides, and $M_xO_y$ oxides that are capable of dissolving in $HNO_3$. More particularly, metal precursors include, for example, metal halides such as $M(NO_3)_x \cdot yH_2O$ (M=Mn, Fe, Co, Cu, Zn, Si), $HfCl_4$ or $NbCl_4$, tetraethyl orthosilicate (TEOS), tetramethyl orthosilicate (TMOS), titanium isopropoxide, zirconium n-propoxide, zirconium butoxide, $Ce(NO_3)_3 \cdot 6H_2O$, $Gd(NO_3)_3 \cdot 6H_2O$, $Sm(NO_3)_3 \cdot 6H_2O$, and the like.

The metal dopant precursors useful in the process of this disclosure include precursors of transition metals, Lanthanide metals, post-transition metals, metalloids, and mixtures thereof. For example, the transition metal precursors comprise Group 3-12 transition metal precursors, in particular, Sc, Y, La, Ti, Zr, Hf, V, Nb, Ta, Cr, Mo, W, Mn, Tc, Re, Fe, Ru, Os, Co, Rh, Ir, Ni, Pd, Pt, Cu, Ag, Au, Zn, Cd and Hg precursors. In an embodiment, the transition metal precursors are selected from Group 6-12 transition metal precursors including Cr, Mo, W, Mn, Tc, Re, Fe, Ru, Os, Co, Rh, Ir, Ni, Pd, Pt, Cu, Ag, Au, Zn, Cd and Hg precursors. Preferably, the Group 6-12 transition metal precursors include Mn, Fe, Co, Ni, Cu and Zn precursors. The Lanthanide metal precursors include La, Ce, Pr, Nd, Pm, Sm, Eu, Gd, Tb, Dy, Ho, Er, Tm, Yb and Lu precursors, or any mixture thereof. The post-transition metal precursors include Al, Ga, In, Tl, Sn, Pb and Bi precursors, or any mixture thereof. The metalloid precursors include B, Si, Ge, As, Sb, Te, Po and At precursors, or any mixture thereof.

The concentration of the metal dopant precursors used in the process of this disclosure can vary over a wide range and need only be at a concentration sufficient to form the manganese oxide adsorbent materials. The metal precursors can be present in a molar concentration ratio of from about $1\times10^{-2}$M to about 10 M, preferably from about $1\times10^{-1}$M to about 5 M, and more preferably from about $5\times10^{-1}$M to about 1 M (based on a total volume).

Preferred metal dopant precursors include $M(NO_3)_x$ (M=Fe, Co, or combinations thereof).

In accordance with the process of this disclosure, the reaction mixture is heated at a temperature and for a period of time sufficient to form the doped manganese oxide adsorbent materials. The heating may be in air, or in some other gas, for example, oxygen, nitrogen, carbon dioxide, helium, argon or a mixture of any two or more of these.

The process of this disclosure can be conducted at a pressure sufficient to form the doped manganese oxide adsorbent materials. Positive or negative pressures may be useful in the process of this disclosure. Suitable combinations of pressure, temperature and contact time may be employed in the process of this disclosure, in particular, temperature-pressure relationships that give doped manganese oxide adsorbent materials having desired properties and/or characteristics. The pressure may range between about ambient and about 50 atmospheres, preferably between about ambient to about 40 atmospheres, and more preferably between about ambient to about 25 atmospheres. Normally the process is carried out at ambient pressure.

The process conditions for doping the manganese oxide with the metal dopant precursor, such as temperature, pressure and contact time, may vary greatly and any suitable combination of such conditions may be employed herein. In a preferred embodiment, the process conditions are sufficient to tune the structural properties of the doped manganese oxide adsorbent. The reaction temperature may be between about −80° C. to about 150° C., and most preferably between about 20° C. to about 80° C. Normally the reaction is carried out under ambient pressure and the contact time may vary from a matter of seconds or minutes to a few hours or greater. The reactants can be added to the reaction mixture or combined in any order. The stir time employed can range from about 0.1 to about 400 hours, preferably from about 1 to 75 hours, and more preferably from about 4 to 16 hours.

Preferred compositions prepared in accordance with this disclosure include, for example, at least one derivative, doped or reduced compound of the formula wherein M is an alkali metal or an alkaline earth metal. In an embodiment, the composition comprises at least one derivative, doped or reduced compound of the formula or at least one derivative, doped or reduced compound of the formula wherein M is an alkali metal or an alkaline earth metal, and $\underline{v}$, $\underline{x}$, $\underline{y}$, and $\underline{z}$ independently have a value from 0 to 8. In an embodiment, the composition has a Birnessite type structure or a Cryptomelane type structure.

The doped manganese oxide adsorbent materials can be used to treat fluids, preferably gas, by passing the gas over and through the product. As used herein, fluids include liquids, gases and mixtures thereof. The doped manganese oxide adsorbent materials work in ambient temperature and pressure. As the gas comes in contact with the doped manganese oxide adsorbent material, the undesirable sulfur of the gas is adsorbed with the doped manganese oxide adsorbent materials, thereby reducing the total amount of sulfur. The doped manganese oxide adsorbent material can be placed in a vessel constructed to allow the sulfur-containing fluid to pass through the vessel and contact the doped manganese oxide adsorbent material, thereby treating and decontaminating the contaminated fluid.

The method of making the doped manganese oxide adsorbent materials involves mixing all the constituents in ambient temperature to achieve a homogenous mix. The amount of each constituent can be varied within the ranges disclosed above, depending on the hydrogen sulfide levels of the fluids. Any of a variety of devices can be used to stir or mix the products, including paddle mixers, tumblers, and a variety of other stirrers or mixers.

In the above detailed description, the specific embodiments of this disclosure have been described in connection with its preferred embodiments. However, to the extent that the above description is specific to a particular embodiment or a particular use of this disclosure, this is intended to be illustrative only and merely provides a concise description of the exemplary embodiments. Accordingly, the disclosure is not limited to the specific embodiments described above, but rather, the disclosure includes all alternatives, modifications, and equivalents falling within the true scope of the appended claims. Various modifications and variations of this disclosure will be obvious to a worker skilled in the art and it is to be understood that such modifications and variations are to be included within the purview of this application and the spirit and scope of the claims.

All reactions in the following examples were performed using as-received starting materials without any purification.

Example 1

Different Metal Ion and Concentration Doping Effects

Iron and cobalt nitrate were selected as metal ion sources for in situ doping with manganese oxide via the following procedure. Various amounts of $M(NO_3)_x \cdot yH_2O$ (M=Fe, Co), $KMnO_4$ (14 g), $MnSO_4$ (20 g), and 0.096 mol $HNO_3$ (6 g) were dissolved in 300 mL of water in a 500 mL round bottom flask and homogenized by stirring at room temperature. The mixture was heated under reflux for 24 hours. Synthesized materials were washed with deionized water several times to remove any unreacted metal salts before being overnight dried in an oven running at 60° C.

Figure 1:
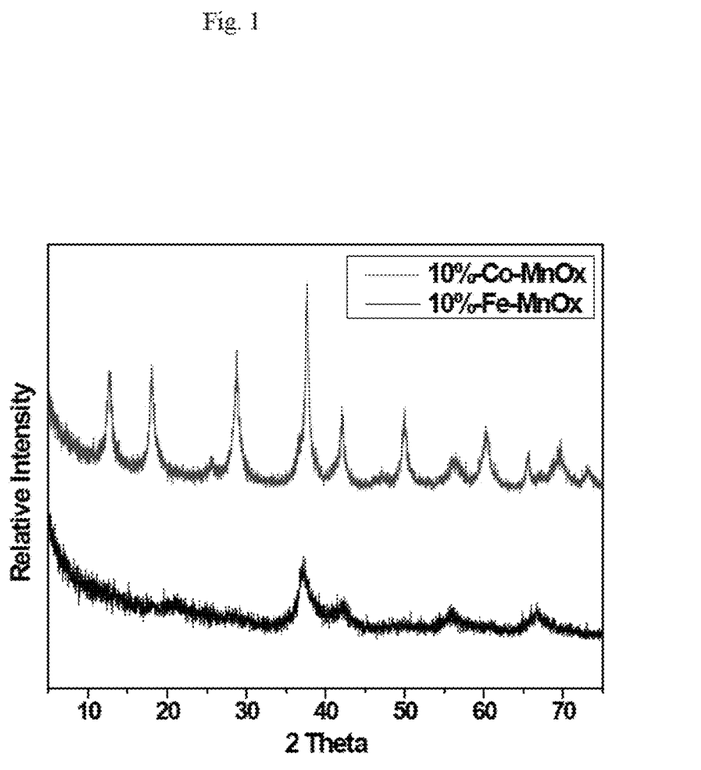
FIG. 1 shows powder x-ray diffraction (PXRD) patterns of metal doped manganese oxide materials after the drying process in accordance with Example 1.

FIG. 1 shows PXRD patterns of metal doped manganese oxide materials after the drying process. The incorporation of iron or cobalt ions affects the formation of the final manganese oxide structure. With the addition of iron ions during synthesis, the Birnessite type manganese oxide structure was obtained after a 24 hour reflux. In the case of cobalt ions, the final tunneling Cryptomelane-type manganese oxide structures were obtained.

Example 2

Physicochemical Parameters for Synthesized Manganese Oxide Materials

Figure 2:
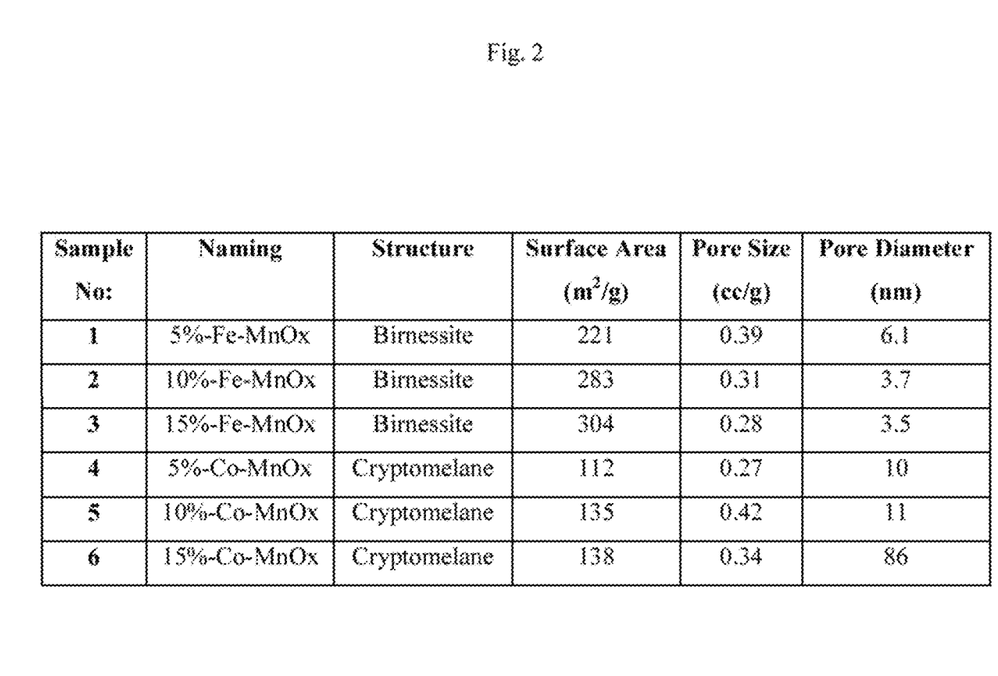
FIG. 2 shows measured surface areas and Barrett-Joyner-Halenda (BJH) desorption pore size distributions of synthesized manganese oxide materials in accordance with Example 2.

Measured surface areas and BJH desorption pore size distributions of synthesized manganese oxide materials prepared in accordance with Example 1 are given in FIG. 2. The incorporation of metal ions into the synthesis procedure affects the physicochemical properties obtained from the materials. In the case of Fe-MnOx material, the surface area increases with the increasing amount of iron nitrate present in the reaction. However, the pore size and diameter decreased from 0.39 cc/g, 6.1 nm to 0.28 cc/g, 3.5 nm. Similar trend was also observed for the cobalt doped system, with the surface area increasing from 112 to 138 m²/g.

Example 3

Figure 3:
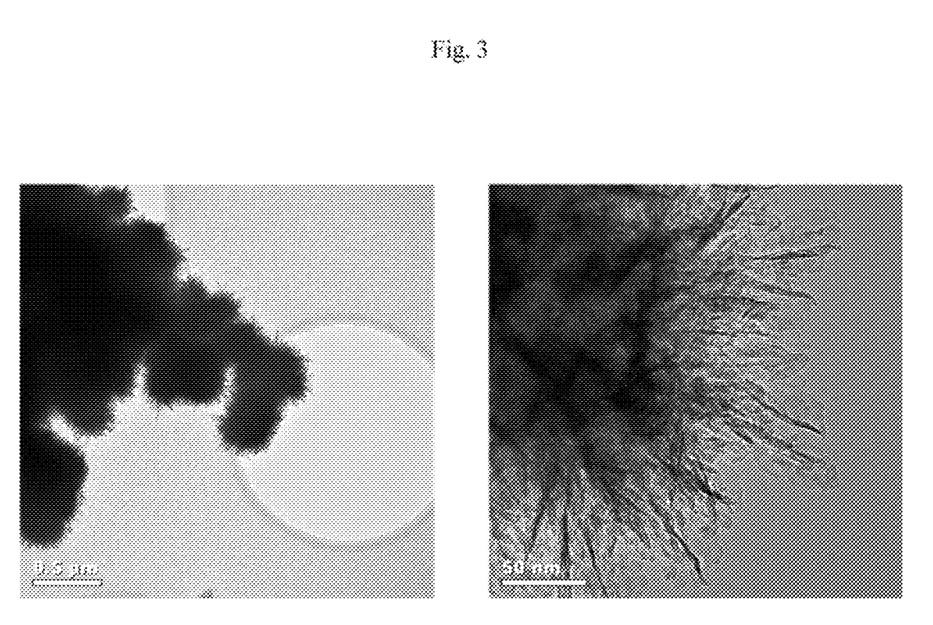
FIG. 3 shows transmission electron microscopy (TEM) images of 10%-Fe-MnOx material in accordance with Example 3.

FIG. 3 shows TEM images of 10%-Fe-MnOx material. The images show spherical-like morphology of the material. The higher magnification image indicates the fact that the material is formed by aggregated plate-like structures, which can be denoted as several layers of Birnessite-type manganese oxide structure units.

Example 4

Figure 4:
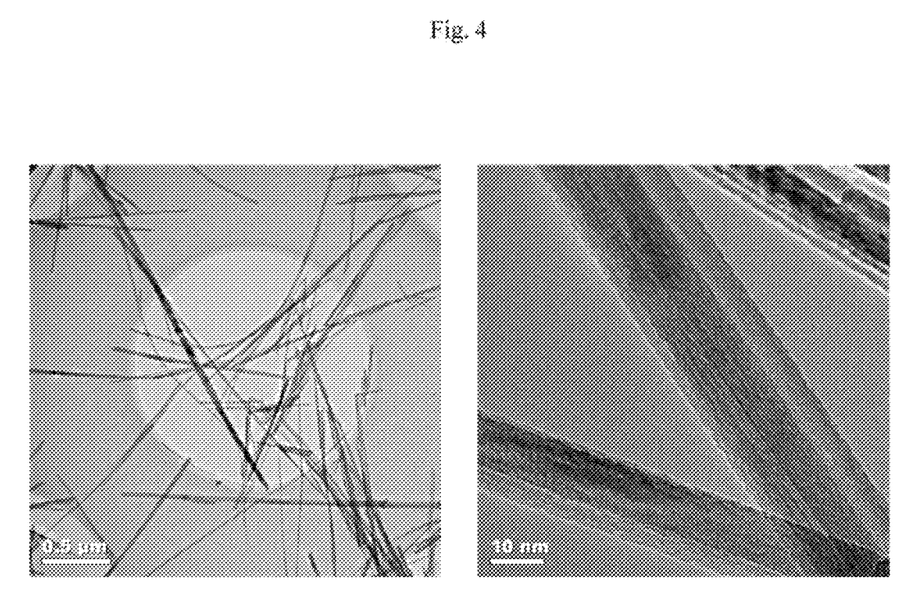
FIG. 4 shows TEM images of 10%-Co-MnOx material in accordance with Example 4.

FIG. 4 shows TEM images of 10%-Co-MnOx material. The images show the typical Cryptomelane-type manganese oxide rod-like morphology. The uniformity in the diameter of the rods (15~20 nm) demonstrates the controlled synthesis of cobalt doped manganese oxide materials.

Example 5

H₂S Sorption Measurements for the Synthesized Doped Manganese Oxides

Figure 5:
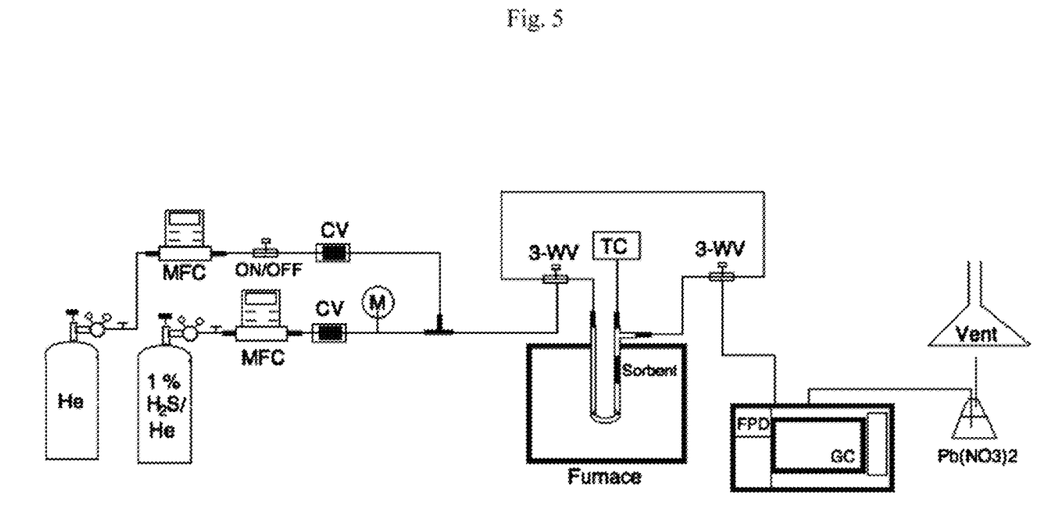
FIG. 5 depicts a schematic representation of the experimental setup (GC: gas chromatograph, FPD: flame photometric detector, MFC: mass flow controller, TC: thermocouple, 3-WV: 3-way valve, CV: check valve, M: manometer) in accordance with Example 5.

The H₂S sorption experiments were performed below 300° C. and equipped with a vertical fixed-bed quartz tubular reactor with an internal diameter of 2 mm. In each experiment, the sorbent was heated to the desired temperature with a He downflow of 36 SCCM and held for 1 hour before the beginning of the sulfidation. FIG. 5 depicts the analytical system that was comprised of a SRI 8610C GC equipped with a flame photometric detector (FPD). A GS-GasPro capillary column (30 m×0.32 mm I.D.) was used for the separation. A 10-port sampling valve with an electronic actuator was used to make automatic injections into the GC every 10 min. All of the tubing and fittings were stainless steel throughout. In each experiment, ~0.1 g of manganese oxide sorbent was placed into the reactor supported by quartz wool. A furnace with PID control was used to hold a constant temperature inside the reactor. The thermocouple was placed at the top of the manganese oxide bed.

FIG. 5 depicts a schematic representation of the experimental setup. (GC: gas chromatograph, FPD: flame photometric detector, MFC: mass flow controller, TC: thermocouple, 3-WV: 3-way valve, CV: check valve, M: manometer).

Figure 6:
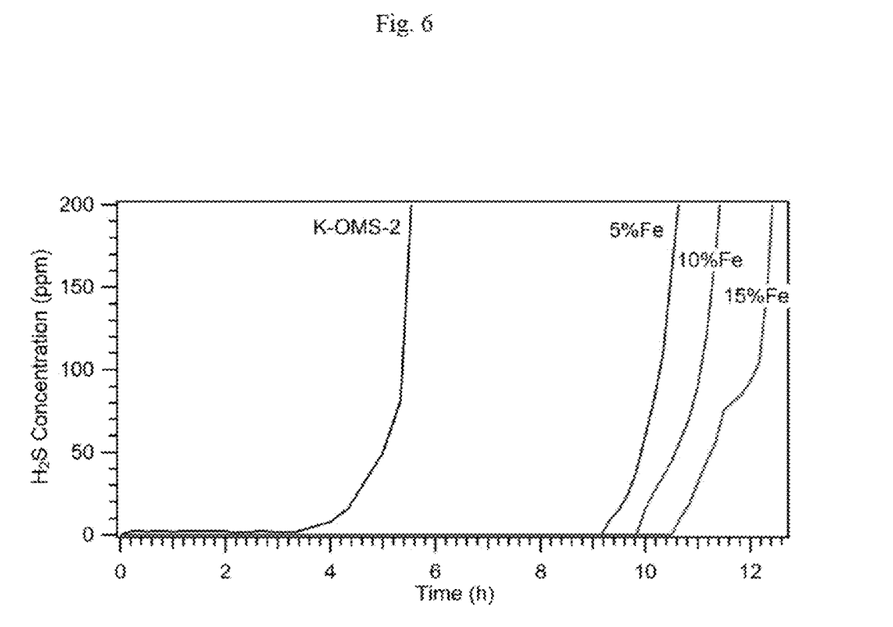
FIG. 6 shows breakthrough curves for the various evaluated Fe-MnOx sorbents in accordance with Example 5.
Figure 7:
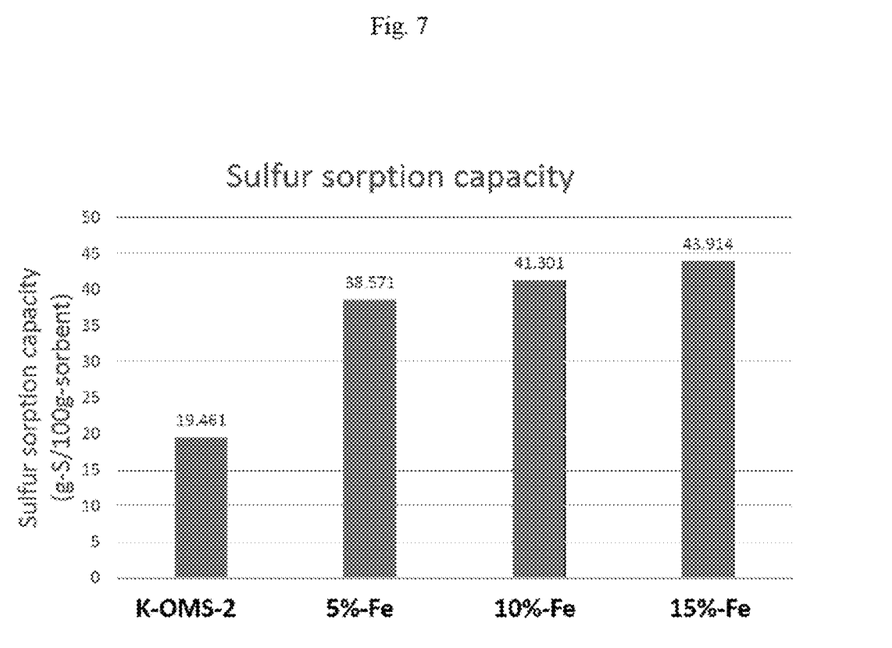
FIG. 7 graphically depicts the sulfur sorption capacities of Fe-MnOx after sulfidation at 300° C. in accordance with Example 5.

The Fe-MnOx samples were tested for sulfidation under 300° C. using H₂S gas as the sulfur source. The breakthrough times (defined as the time when the outlet H₂S concentration reaches 50 ppm) of the Fe-MnOx materials are shown in FIG. 6. These measured breakthrough times of the manganese oxide materials are proportional to the increased amounts of iron nitrate added as well as the surface area of the materials. The breakthrough time of 5%-Fe-MnOx is 8.9 hours, 10%-Fe-MnOx is 10.2 hours, and 15%-Fe-MnOx is 10.7 hours. The pure Cryptomelane-type K-OMS-2 material is selected as standard material for comparison. From the obtained results, 15%-Fe-MnOx material exhibits the highest breakthrough time, more than double (4.6 hours and 10.7 hours) the time of K-OMS-2 material. FIG. 7 graphically depicts the sulfur sorption capacities of Fe-MnOx after sulfidation at 300° C.

Figure 8:
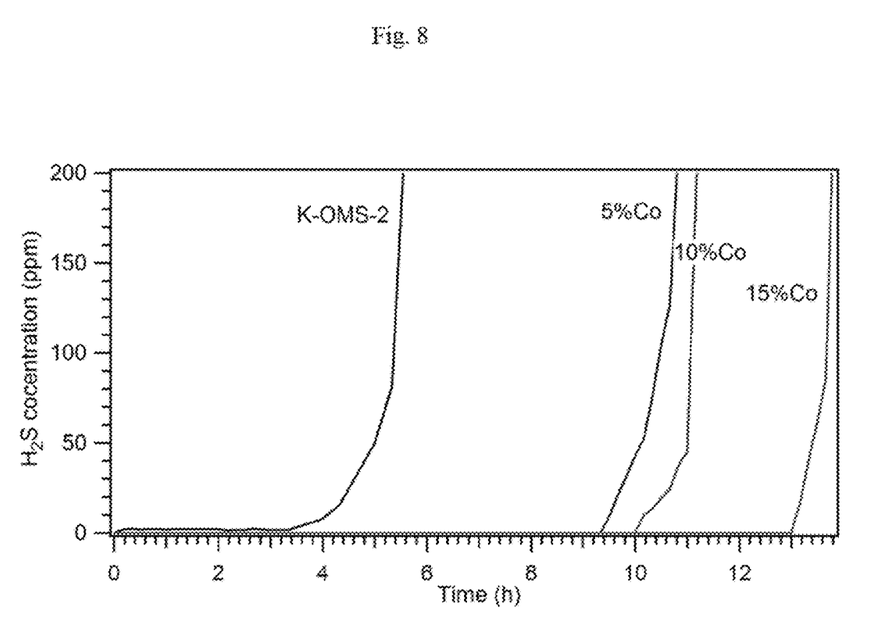
FIG. 8 shows breakthrough curves for the various evaluated Co-MnOx sorbents in accordance with Example 5.
Figure 9:
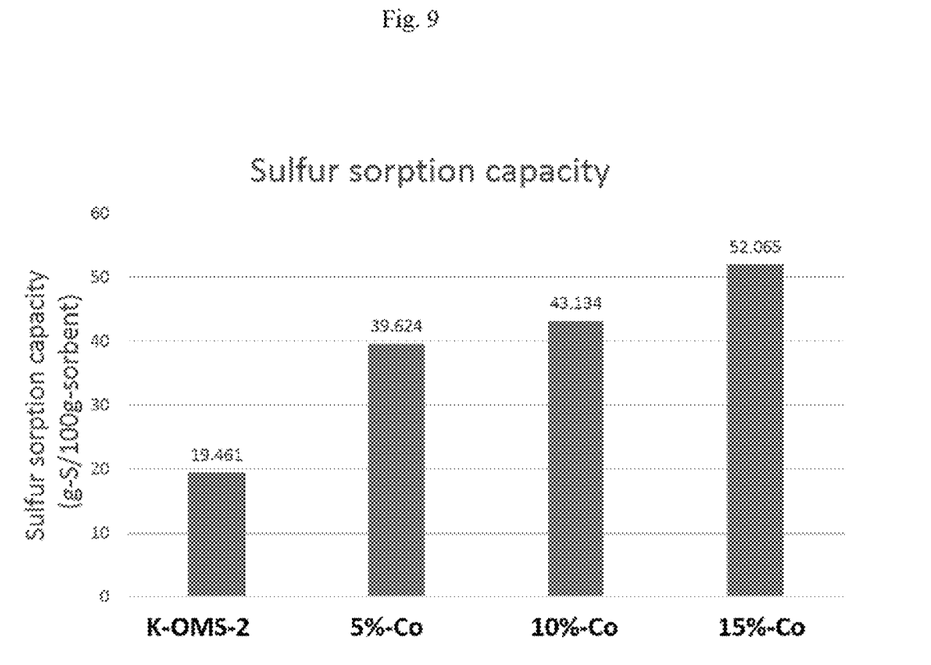
FIG. 9 graphically depicts the sulfur sorption capacities of Co-MnOx after sulfidation at 300° C. in accordance with Example 5.

Similar to Fe-MnOx materials, Co doped manganese oxides were also tested for sulfidation as shown in FIG. 8. Surprisingly, the Co-MnOx series materials have lower surface areas than Fe-MnOx materials, but their breakthrough times were higher, especially for the 15%-Co-MnOx (12.8 hours). The synthesized Co-MnOx materials have Cryptomelane-type structure which is analogous to the standard K-OMS-2 material. The cobalt ions incorporated into Cryptomelane-type structure not only increase the surface area, but also helped adsorb more sulfur during sulfidation. FIG. 9 graphically depicts the sulfur sorption capacities of Co-MnOx after sulfidation at 300° C.

The sulfur sorption capacity at breakthrough for the material sulfided at various temperatures was determined as shown below:

$$SC\left(\frac{\text{g sulfur}}{100 \text{ g sorbent}}\right) = (WHSV) \times \left[\frac{M}{V_{mol}} \times \int_0^t (C_{in} - C_{out}) dt\right]$$

where WHSV is the weight hourly space velocity in $mLh^{-1} g^{-1}$, M is the atomic weight of sulfur (32 g mol⁻¹), $V_{mol}$ is the molar volume in L mol⁻¹ under standard conditions of 298 K and 1 atm (24.5 L mol⁻¹), $C_{in}$ and $C_{out}$ are the inlet and outlet concentrations (%), respectively, and t is the breakthrough time (BT) in hours. The sulfur sorption capacities were determined using the equation presented above.

Example 6

Effects of Adding Binders into Fe-MnOx and Co-MnOx Materials

Figure 10:
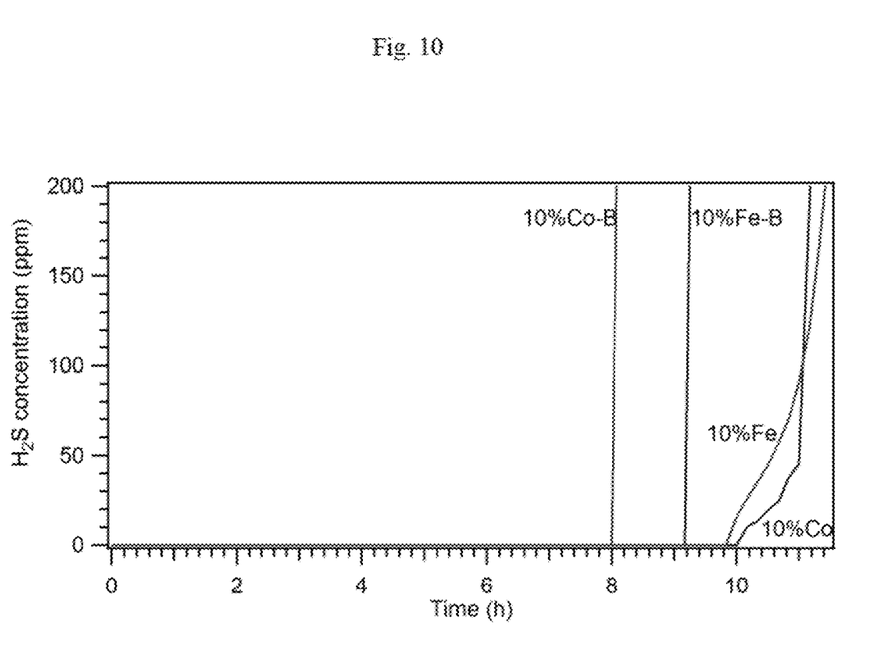
FIG. 10 shows breakthrough curves for the various evaluated for Fe-MnOx and Co-MnOx with binders as sorbents in accordance with Example 6.

To investigate the effects of binders for sulfur sorption capacities, 10% Fe-MnOx and Co-MnOx were chosen as the starting materials for diluting with binders. Kaoline or kaolinite was selected as a binder in this system. The preparation was accomplished by adding 70% weight ratio of binders into the reaction after completing the reflux. The materials were filtered and transformed into pellets. The diluted materials named 10%-Fe-MnOx-B and 10%-Co-MnOx-B were also tested for H₂S sorption. The breakthrough time and capacity of 10% Fe-MnOx with the binder is 8.6 hours and 37 hours, respectively. Compared to 10% Fe-MnOx, 10%-Fe-MnOx-B with binders showed only minor performance loss even with a high percentage of clay added. In the case of 10%-Co-MnOx-B material, the breakthrough time and capacity loss is slightly higher than in the case of 10%-Co-MnOx FIG. 10 shows breakthrough curves for the various evaluated for Fe-MnOx and Co-MnOx with binders as sorbents.

Figure 11:
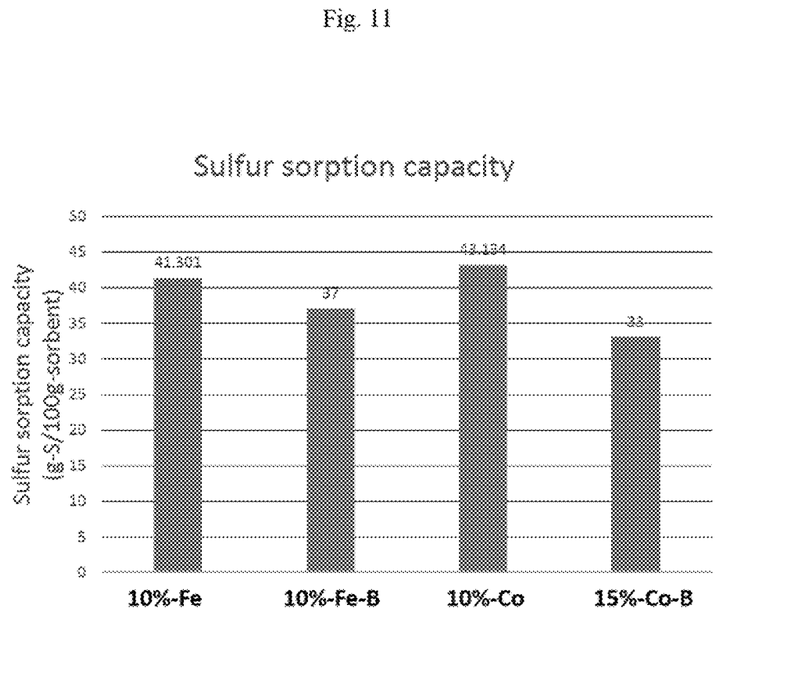
FIG. 11 graphically shows sulfur sorption capacities of Fe-MnOx and Co-MnOx with binders after sulfidation at 300° C. in accordance with Example 6.

FIG. 11 graphically shows sulfur sorption capacities of Fe-MnOx and Co-MnOx with binders after sulfidation at 300° C.

All patents and patent applications, test procedures (such as ASTM methods, UL methods, and the like), and other documents cited herein are fully incorporated by reference to the extent such disclosure is not inconsistent with this disclosure and for all jurisdictions in which such incorporation is permitted.

When numerical lower limits and numerical upper limits are listed herein, ranges from any lower limit to any upper limit are contemplated. While the illustrative embodiments of the disclosure have been described with particularity, it will be understood that various other modifications will be apparent to and can be readily made by those skilled in the art without departing from the spirit and scope of the disclosure. Accordingly, it is not intended that the scope of the claims appended hereto be limited to the examples and descriptions set forth herein but rather that the claims be construed as encompassing all the features of patentable novelty which reside in the present disclosure, including all features which would be treated as equivalents thereof by those skilled in the art to which the disclosure pertains.

The present disclosure has been described above with reference to numerous embodiments and specific examples. Many variations will suggest themselves to those skilled in this art in light of the above detailed description. All such obvious variations are within the full intended scope of the appended claims. Also, the subject matter of the appended dependent claims is within the full intended scope of all appended independent claims.

What is claimed is:

1. A method for removing sulfur-containing compounds from a fluid, the method comprising:
   adding manganese oxide to the fluid;
   doping the manganese oxide in situ with iron, cobalt, or combinations thereof to give a doped manganese oxide adsorbent; and
   contacting the fluid with a selected amount of the doped manganese oxide adsorbent and at a selected temperature and pressure sufficient for the doped manganese oxide adsorbent to preferentially adsorb the sulfur-containing compounds in the fluid.

2. The method of claim 1, wherein the contacting is conducted at a temperature of 300° C. or less.

3. The method of claim 1, wherein the manganese oxide is a manganese oxide octahedral molecular sieve (OMS) material.

4. The method of claim 1, wherein the iron doped manganese oxide adsorbent has a Birnessite type structure or a Cryptomelane type structure.

5. The method of claim 1, wherein the sulfur-containing compounds comprises hydrogen sulfide, thiols (mercaptans), and/or derivatives thereof.

6. The method of claim 1, wherein iron in the iron doped manganese oxide adsorbent is present in an amount of from about 0.1 weight percent to about 25 weight percent, and wherein cobalt in the cobalt doped manganese oxide adsorbent is present in an amount of from about 0.1 weight percent to about 25 weight percent.

7. The method of claim 1, wherein the doped manganese oxide adsorbent includes a binder material.

8. The method of claim 1, further comprising regenerating the doped manganese oxide adsorbent by anion exchange at a temperature and for a period to time sufficient to substantially remove the sulfur-containing compounds.

9. The method of claim 1, wherein the doped manganese oxide adsorbent is adapted to adsorb sulfur-containing compounds comprising thiols, sulfides, thiophenes and alkyl derivatives thereof.

10. The method of claim 1, wherein the doped manganese oxide adsorbent has a sulfur sorption capacity of from about 30 to about 60 g-S/100 g sorbent after sulfidation at 300° C.

11. The method of claim 1, further comprising conducting the process under reaction conditions sufficient to tune the structural properties of the doped manganese oxide adsorbent.

12. The method of claim 11, wherein the structural properties comprise surface area, pore size and pore volume.

* * * * *